(12) United States Patent
Shalla et al.

(10) Patent No.: US 8,965,861 B1
(45) Date of Patent: Feb. 24, 2015

(54) CONCURRENCY CONTROL IN DATABASE TRANSACTIONS

(75) Inventors: Zachary M. Shalla, Seattle, WA (US); Ullas Sankhla, Seattle, WA (US); Shen Pan, Bellevue, WA (US); Nagesh V. Honnalli, Seattle, WA (US); Surendra Moolchand Bashani, Mercer Island, WA (US); Vaibhav Sharma, Bellevue, WA (US); Gaurav D. Ghare, Seattle, WA (US); Sushanth Tiruvaipati, Seattle, WA (US); Léon Thrane, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 213 days.

(21) Appl. No.: 13/536,411

(22) Filed: Jun. 28, 2012

(51) Int. Cl.
*G06F 17/30* (2006.01)
(52) U.S. Cl.
USPC .......................................... 707/703; 707/799
(58) Field of Classification Search
None
See application file for complete search history.

(56) References Cited

U.S. PATENT DOCUMENTS

| | | | |
|---|---|---|---|
| 6,185,555 B1 * | 2/2001 | Sprenger et al. | 1/1 |
| 2002/0138483 A1 * | 9/2002 | Bretl et al. | 707/8 |
| 2008/0147504 A1 * | 6/2008 | Suk | 705/14 |
| 2008/0163222 A1 * | 7/2008 | Bourbonnais et al. | 718/101 |
| 2011/0041006 A1 * | 2/2011 | Fowler | 714/10 |
| 2011/0078214 A1 * | 3/2011 | Michaylov et al. | 707/809 |

* cited by examiner

*Primary Examiner* — Anh Tai Tran
(74) *Attorney, Agent, or Firm* — Kilpatrick Townsend & Stockton LLP

(57) ABSTRACT

To achieve long running batch updates, a transaction aggregator layer and one or more data aggregation queues, such as a command queue, are placed between one or more clients and a database. Writes go to the database aggregator layer and are enqueued in the appropriate data aggregation queue, which may be allocated by transaction. Committing the transaction drains the queue and writes the contents of the queue in one transaction-like update to the database. By using the transaction logic in the transaction aggregator layer, transaction-like behavior may be achieved that allows both updates and transactions to scale with less impact on database servers.

26 Claims, 7 Drawing Sheets

CONCURRENCY CONTROL IN DATABASE TRANSACTIONS

BACKGROUND

Databases can be difficult to scale as demands on a database increase. Many conventional horizontal and vertical scaling techniques may attempt to solve some of the problems of scaling. Still, when placing large amounts of data into a database, whether horizontally or vertically scaled, the database may exceed the input/output capacity of its host system. For example, the database may be input/output bound to the number of connections available to the database. In other cases, the database may be input/output bound to the amount of memory available for transactions. As a result, clients may experience periods of database unavailability when the database is busy.

For example, long running transactions of seconds or minutes may require significant input/output overhead while locking clients from the database for large amounts of time. The input/output bounding can prevent the scaling of databases to receive and contain large amounts of data. To ease the scaling problem, some database managers may use larger database hardware with more capabilities, such as memory and input/output throughput.

DETAILED DESCRIPTION

Figure 1:
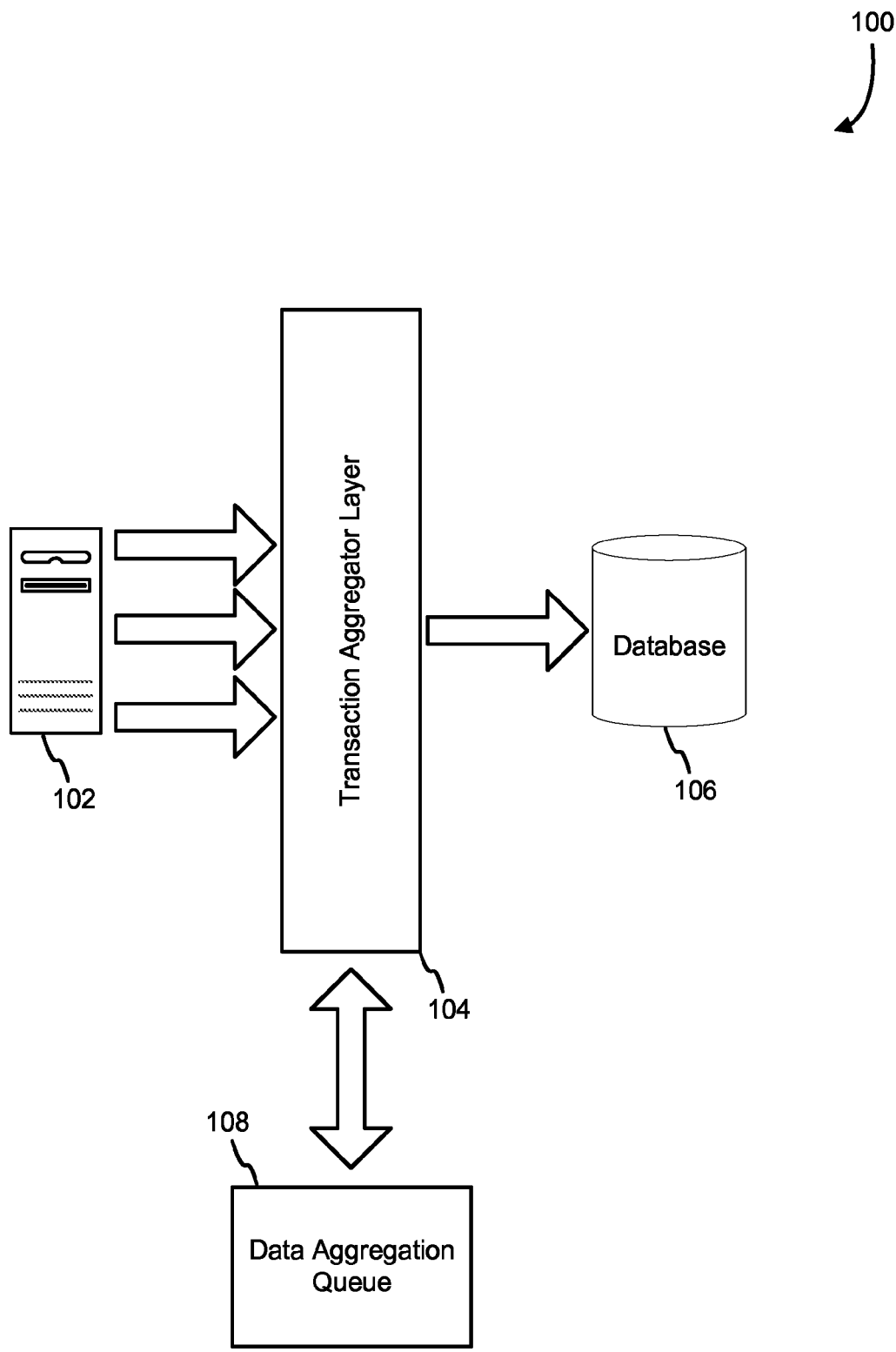
FIG. 1 shows an illustrative example of an environment using a transaction aggregator layer in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include placing a transaction aggregation layer between a client and a database to reduce a load from a large number of transactions on the database. The transaction aggregator layer may receive a request to open a queue for aggregation. The transaction aggregator layer may then enqueue data manipulation requests, such as transactional writes, in a data aggregation queue. After receiving a request to close the queue, the transaction aggregation layer may commit the data manipulation requests in the data aggregation queue to the database in a single transaction. This method allows transaction-like behavior from long running batch updates.

For example, to achieve long running batch updates, a transaction aggregator layer and one or more data aggregation queues, such as a command queue, are placed between one or more clients and a database. Writes go to the database aggregator layer and are enqueued in the appropriate data aggregation queue, which may be allocated by transaction. Committing the transaction drains the queue and writes the contents of the queue in one transaction-like update to the database. By using the transaction logic in the transaction aggregator layer, transaction-like behavior may be achieved that allows both updates and transactions to scale with less impact on database servers.

By aggregating data manipulation requests into the transaction aggregator layer in accordance with the various embodiments described and suggested herein, several technological benefits may be obtained. For example, databases performing many transactions and/or large transactions may become input/output bounded, such as running out of available connections, running out of memory and/or increased disk input/output ("I/O") because of maintaining database state. In some cases, large single database transactions may take seconds or minutes as opposed to small transactions that may be measured in milliseconds or less. By using a transaction aggregator layer, the number of database connections may be reduced and the input/output ("I/O") demand decreased and/or distributed over time. As the input/output demand is decreased, the database hardware demand may be lower. In some embodiments, this may allow large databases to run on commodity hardware as the input/output demand is no longer as strenuous. In other embodiments, the aggregation of data manipulation requests enable load balancing and scheduling of transactions. For example, data manipulation can be selectively performed at times when a database is relatively idle. When not serving customer traffic, the aggregated data manipulations may be performed as a transaction. By performing aggregated data manipulation transactions when customer traffic is low, a better customer experience may be provided because the database may be more responsive during high customer traffic times without the additional load of the aggregated data manipulations. In some embodiments, as the demand on the database is decreased, a database may be scaled to larger volumes of data than were possible without the transaction aggregation layer. Another advantage is that the database retains a consistent view during the operation of the transaction aggregator layer. Yet another advantage is that the transaction may be performed atomically. Another advantage includes concurrency controls, such as locking and locking scope.

It should be recognized that a data aggregation queue may take the forms of multiple storage technologies. Queue is used in the sense of a place of temporary holding. In fact, the data aggregation queue may be formed of technologies that may include SQL Databases, NoSQL Databases, Files, XML, JSON, Caches, FIFO Queues, LIFO Queues, Stacks, Collections, Arrays or other technologies applicable to data storage. In one embodiment, the data aggregation queue is placed on a semi-persistent data store, which includes data that is acceptably lost during a failure, but used during normal operation.

It should also be noted that computing resources discussed herein may include virtual resources as well. A server, for example, may be running directly on the hardware or provided services through a virtual machine. Storage, databases and other computing resources may also be managed resources, whether on hardware directly or on a virtual machine.

The transaction aggregator layer may use different types of locking, which may include optimistic locking and pessimistic locking Optimistic locking allows the transaction that commits first to succeed. For example, timestamps in the database may be used to determine which commit first succeeded. Pessimistic locking allows the transaction that starts first to succeed. For example, timestamps in the data aggregation queues may be examined for priority. In some embodiments, optimistic locking may include delaying the locking of the database toward the time of committing a transaction to the database. In one embodiment using optimistic locking, the transaction is attempted without an external request to lock the database, and instead relying on the database to process the transaction. In some embodiments, pessimistic locking may include decreasing the delay between receiving transaction information and locking the database. In one embodiment using optimistic locking, the transaction aggregator layer will receive data manipulation requests and place them in the queue without locking the database. After all of the data manipulation requests for a transaction are received and the data aggregation queue is closed, the transaction aggregator layer may determine if the data manipulation requests may be performed on the database. This determination may include having the transaction aggregator layer determine if data dependencies of the data manipulation requests to the database are still valid, such as by checking timestamps. The determination may also include failing if dependencies are included between data manipulation requests in the transaction. In some embodiments, this may include determining if data in the database affected by the data manipulation requests has changed since the data manipulation request was created and/or stored in the data aggregation queue. If the data dependencies are invalid, the transaction aggregator may fail without proposing a transaction with the database. However, if the data dependencies are valid, the transaction aggregator may lock the database such that the data dependencies may no longer be changed by external requests. The transaction aggregator layer may then commit the data manipulation requests stored in the data aggregation queue to the database.

In one embodiment using pessimistic locking, the transaction aggregator may receive information about the data manipulation requests that are to be sent to the data aggregation queue, such as data manipulation requests related to billing information for a client. The transaction aggregator layer may lock the database or relevant parts of a database, such as tables and/or rows, such that billing information for the client may not be modified. The transaction aggregator layer may then store received data manipulation requests in the data aggregation queue. Once all the data manipulation requests have been received and/or the data aggregation queue has been closed, the transaction aggregator layer may commit the data manipulation requests in the data aggregation queue to the database in a single transaction.

In some embodiments, the filling of a data aggregation queue may occur over time. In one embodiment, after opening a data aggregation queue, a client may perform multiple application interface calls over time with the transaction aggregation layer. Each application interface call may provide a subset of the total data manipulation requests to store in the data aggregation queue to form a transaction. In another embodiment, multiple clients may perform application interface calls to store data manipulation requests in the data aggregation queue. In one embodiment, the data manipulation requests may be received with further information. For example, a client may receive instructions that include the data manipulation and metadata identifying the ordering of the data manipulation in the transaction.

Turning now to FIG. 1, an illustrative example of an environment 100 using a transaction aggregator layer is shown. In this example, the environment 100 includes a client 102, a transaction aggregator layer 104 and a database 106. The client 102 may be a computing resource, including a server, virtual machine, computer, that may be configured to communicate with a database and/or make application interface calls. The transaction aggregator layer, for example, 104 may be a layer of one or more servers between the database and the client. The database 106 may be, for example, a collection of servers that work together to provide database functionality that may include atomicity, consistency, isolation and durability through transactional behavior. The client 102, transaction aggregator layer 104 and database 106 may communicate using protocols over a network. The client 102 may provide data manipulation requests to the transaction aggregator layer 104 to apply as a single transaction to the database 106. A transaction is a unit of work applied to a database in which the contents of the transaction are applied or fail, but leave the database in a consistent state.

In the embodiment shown, a client 102, such as a server, has data manipulation requests to store in a database 106. The client may communicate with the transaction aggregator layer 104 requesting the transaction aggregator layer 104 to store the data manipulation requests to form a transaction to be applied to the database 106. The transaction aggregator layer 104 may open a data aggregation queue 108 to hold the incoming data manipulation requests. The client 102 may then electronically transmit data manipulation requests to the transaction aggregator layer 104, which stores the data manipulation requests 108 in the data aggregation queue 108. Once the client 102 has completed electronically transmitting the data manipulation requests, the data aggregation queue 108 may be closed. Using a version of optimistic locking, the transaction aggregator layer 104 may determine if the transaction can be performed based at least in part on the data manipulation requests in the data aggregation queue remaining unaffected by any changes to the database 106 during the filling of the data aggregation queue 108. If determined that the transaction cannot be performed, the transaction aggregation layer 104 may report the failure to the client 102. If determined that the transaction can be performed, the transaction aggregator layer 104 may choose a scope of locking that covers the data dependencies of the data manipulation requests and lock the database 106. During locking scope selection, options exist to lock individual rows (which may be more costly) through locking rows to locking entire columns. The more that is locked, the less costly and more likely a collision occurs that would cause the transaction to fail. The transaction aggregator layer 104 may then retrieve the data manipulation requests from the data aggregation queue 108 and commit them to the database 106. After committing the data manipulation requests from the data aggregation queue 108, the transaction aggregator layer 104 may unlock the database 106 and report the results to the client 102.

In one example, a usage server, as a client 102, may report usage of a service to a transaction aggregator layer 104 comprising a set of servers. The usage server may send an application programming interface (API) call to one of the set of servers of the transaction aggregator layer 104 to request aggregation of transactional writes, as data manipulation requests, destined for a billing database 106 supported by a SQL database optimized for storage of a large amount of information. The transaction aggregator layer 104 makes available a data aggregation queue supported by a document-based database optimized for a large volume of small transactions. Through one or more API calls, the usage server may provide transactional writes, such as conditional writes, that are stored in the data aggregation queue 108. After providing all of the transactional writes to be used in the transaction, the client may request to close the data aggregation queue 108. Upon closing the data aggregation queue 108, the transaction aggregator layer 104 may verify that the stored transactional writes in the data aggregation queue 108 were not invalidated by other transactions that may have occurred on the billing database 106. If the transactional writes are still valid, the transactional aggregator layer 104 may lock the database using a scope preventing changes to data in the billing database 106 writable by the usage server. The transaction aggregator layer 104 may then commit the transactional writes in the data aggregation queue 108 to the billing database 106 using one transaction. After the transaction is complete, the transaction aggregator layer 104 may then unlock the billing database 106.

Figure 2:
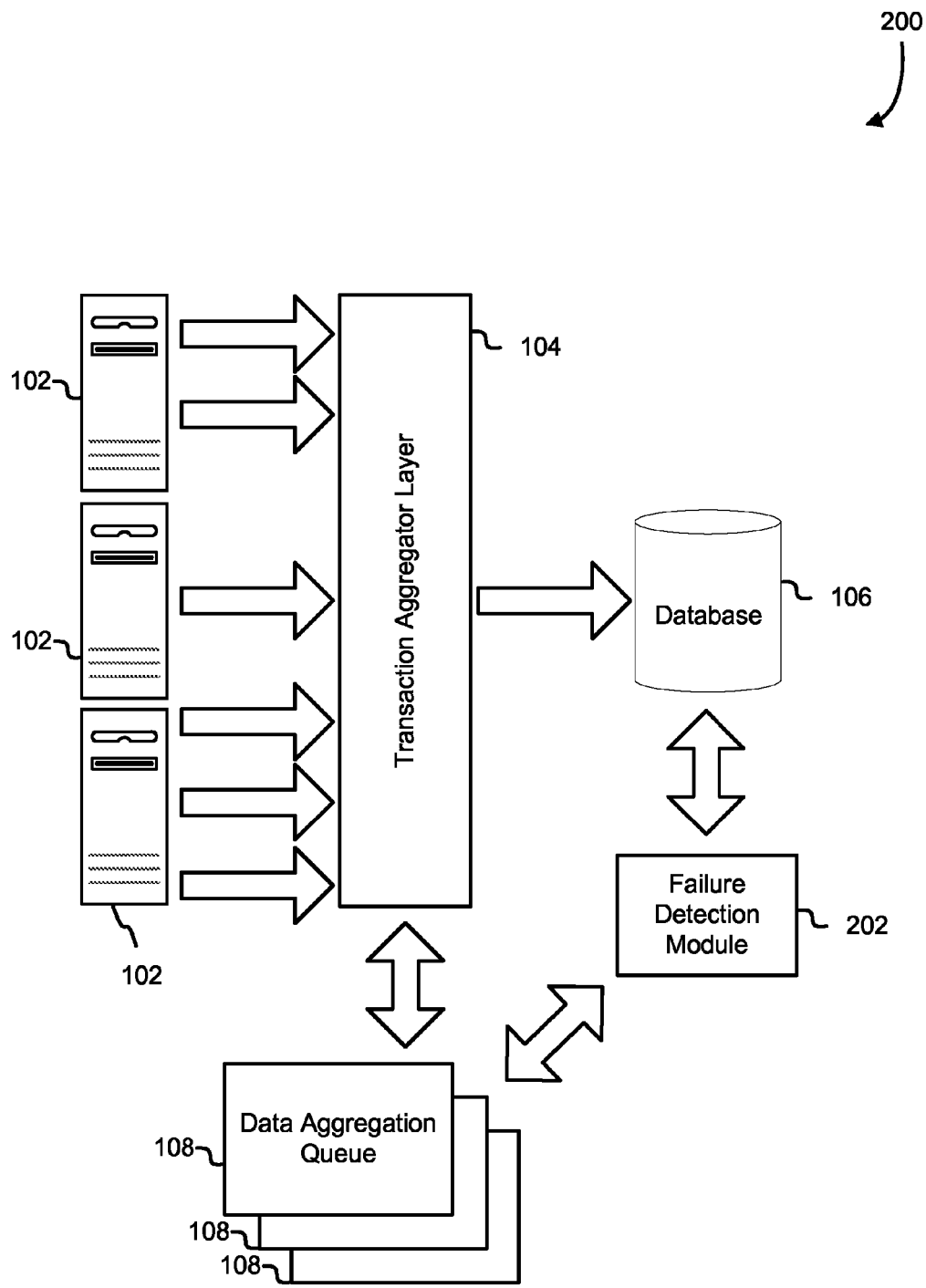
FIG. 2 shows an illustrative example of a more complex environment using a transaction aggregator layer in accordance with at least one embodiment.

Turning now to FIG. 2, an illustrative example of a more complex environment 200 using a transaction aggregator layer is shown. In the embodiment shown, a plurality of clients 102 with different numbers of requests communicates with the transaction aggregator layer 104 in order to store data manipulation requests with the database 106. In the embodiment shown, a plurality of servers 102 may request to open a data aggregation queue 108. In some embodiments, a subset of the plurality of clients 102 request to share a transaction and may work together to provide the data manipulation requests to use in a single transaction. Upon receiving a request for a data aggregation queue 108, a data aggregation queue 108 may be selected for use. The data aggregation queue 108 may be selected based on data dependencies in the database 106 and/or scope of the transaction. In some embodiments, if the data aggregation queue is in use, the requestor may have to wait for the data aggregation queue to become available. As the data aggregation queue 108 may be selected based at least in part on the scope of the transaction, a shared scope may cause any requestors to wait until the prior requestor has finished its transaction. This prevention of causing a requestor to wait may help prevent transactions from failing.

Once selected and available, the data aggregation queue 108 may store data manipulation requests received by the transaction aggregator 104 from the plurality of clients 102 sharing the data aggregation queue 108. A failure detection module 202 may detect if any changes have affected the data dependencies between the data manipulation requests in the data aggregation queue 108 and the database 106. If not, the plurality of clients 102 may request to close the data aggregation queue 108. In some embodiments, this may occur based on the first client 102 to request the data aggregation queue 108 be closed. In other embodiments, all clients 102 associated with the data aggregation queue 108 must close the data aggregation queue 108. As the failure detection module 202 has been monitoring changes, the transaction aggregator layer 104 may lock the database 106 with a scope related to the data manipulation requests and commit the transaction using the data manipulation requests stored in the data aggregation queue 108. After which, the database 106 may be unlocked and the transaction status may be reported to one or more of the plurality of clients 102.

While the data aggregation queue 108 is receiving data manipulation requests, it can be desirable to fail-fast or fail the transaction before all of the data manipulation requests are aggregated in the data aggregation queue. In some embodiments, a failure detection module 202 may discover if the transaction may fail due to a change in the underlying data within the database 106 forming a data dependency. The failure detection module may monitor the database 106 for changes to data forming a data dependency with the data manipulation requests stored within the data aggregation queue 108. If a change to data having a data dependency in the data aggregation queue 108 is detected, the failure detection module 202 may cause the aggregation to fail. For example, a refund has been requested of a billing system and the refund is stored in the data aggregation queue 108. If the refund is processed through another process, such as through a phone call to an agent, while the data aggregation queue also contains the refund, the failure detection module detects that a refunded amount to a client has changed while a refund amount also exists in the data aggregation queue 108. The failure detection module 202 may then communicate to the transaction aggregator layer 104 which may then communicate to the plurality of clients 102 that the billing transaction has failed. After which, the plurality of clients 102 may determine whether to resubmit the data manipulation requests in whole, not at all or only a subset of the data manipulation requests. In some embodiments, the failure detection module 202 may be internal or external to the database. For example, the failure detection module 202 may compare a timestamp or version of data within the database 106 with a timestamp or version of data manipulation requests within the data aggregation queue. If there is a mismatch, the failure detection module 202 may determine the transaction is failed.

For example, a catalog domain may include several servers that are responsible for different portions of the catalog, such as description, images and ratings. The servers may request to submit transactional writes to the catalog database 106 through an API call to the transaction aggregator layer 104. The transactional aggregator layer 104 may select a data aggregation queue 108 related to the scope of the transactional writes, such as video games. The transactional aggregator layer 104 may receive API calls from the servers with instructions on performing one or more of the transactional writes relating to descriptions, images and/or ratings. A failure detection module 202 verifies that no changes occur to the data in the databases which are related to the transactional writes, such as product page information. If a change is detected, the failure detection module 202 causes the transaction to fail. In some embodiments, the failure detection module also determines the scope of the transactional writes to use for the database locking. If no changes are detected, the scope of the transactional writes may be used to lock the database to changes. The database aggregation queue 108 may supply the transactional writes to commit to the database 106 by the transaction aggregator layer 104 in a single transaction.

Figure 3:
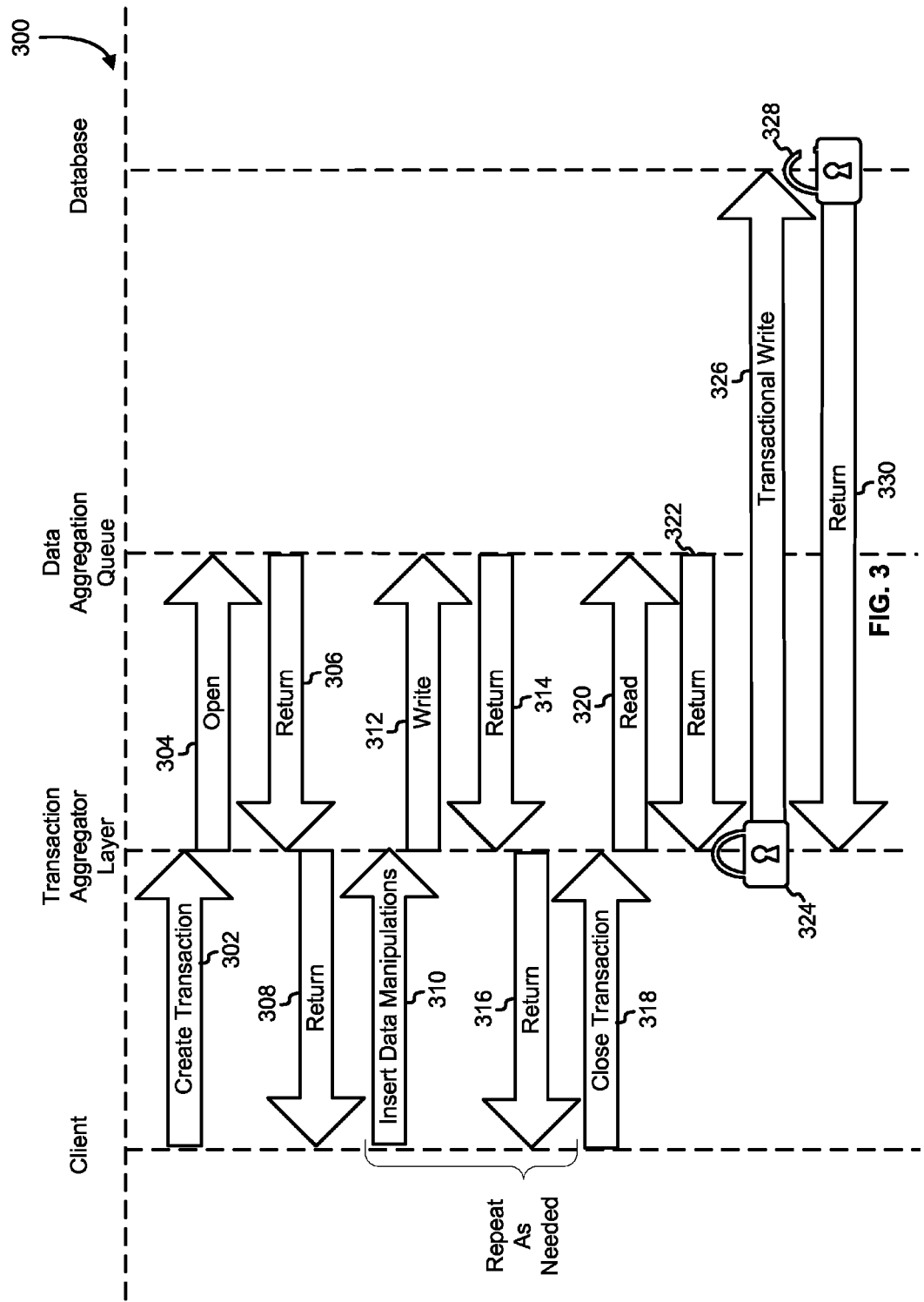
FIG. 3 shows an illustrative diagram of control flow with use of a transaction aggregator layer in accordance with at least one embodiment.

Turning now to FIG. 3, an illustrative diagram of control flow 300 using optimistic locking and a transaction aggregator layer is shown. This may be accomplished by a system such as seen in FIG. 1, including a client 102, transaction aggregator layer 104, database 106 and data aggregation queue 108. A client 102 may request 302 that the transaction aggregator layer 104 create a new transaction. The transaction aggregator layer 104 may open 304 a new data aggregation queue to receive data manipulation requests into the transaction. The system may return 306, 308 from the data aggregation queue 108 through the transaction aggregator layer 104 to wait for further instructions from the client 102. In some embodiments, these returns are a success confirmation of the operations (such as a return from an API call). The client 102 may then request 310 one or more data manipulation requests be inserted into the transaction 310. The transaction aggregator layer 104 may then write 312 the one or more data manipulation requests to the data aggregation queue 108. The control may be returned 314, 316 from the data aggregation queue 108 through the transaction aggregator layer 104 to the client 102. In some embodiments, this may also include a success message. If needed, the client 102 may repeat 310 to 316 as many times as needed to include all of the desired data manipulation requests in the transaction. After including all of the desired data manipulation requests in the transaction, the client 102 may request to close 318 the transaction. The transaction aggregator layer 104 may then determine if the data dependencies of the data manipulation requests are still valid. If so, the transaction aggregator layer 104 may read the data aggregation queue 320, 322, lock 324 the database and place 326 the read data manipulation requests into a transactional write into the database 106. After the transactional write 326, the database may be unlocked 328 and the result of the transactional write is reported 330 to the transaction aggregator layer 104.

Figure 4:
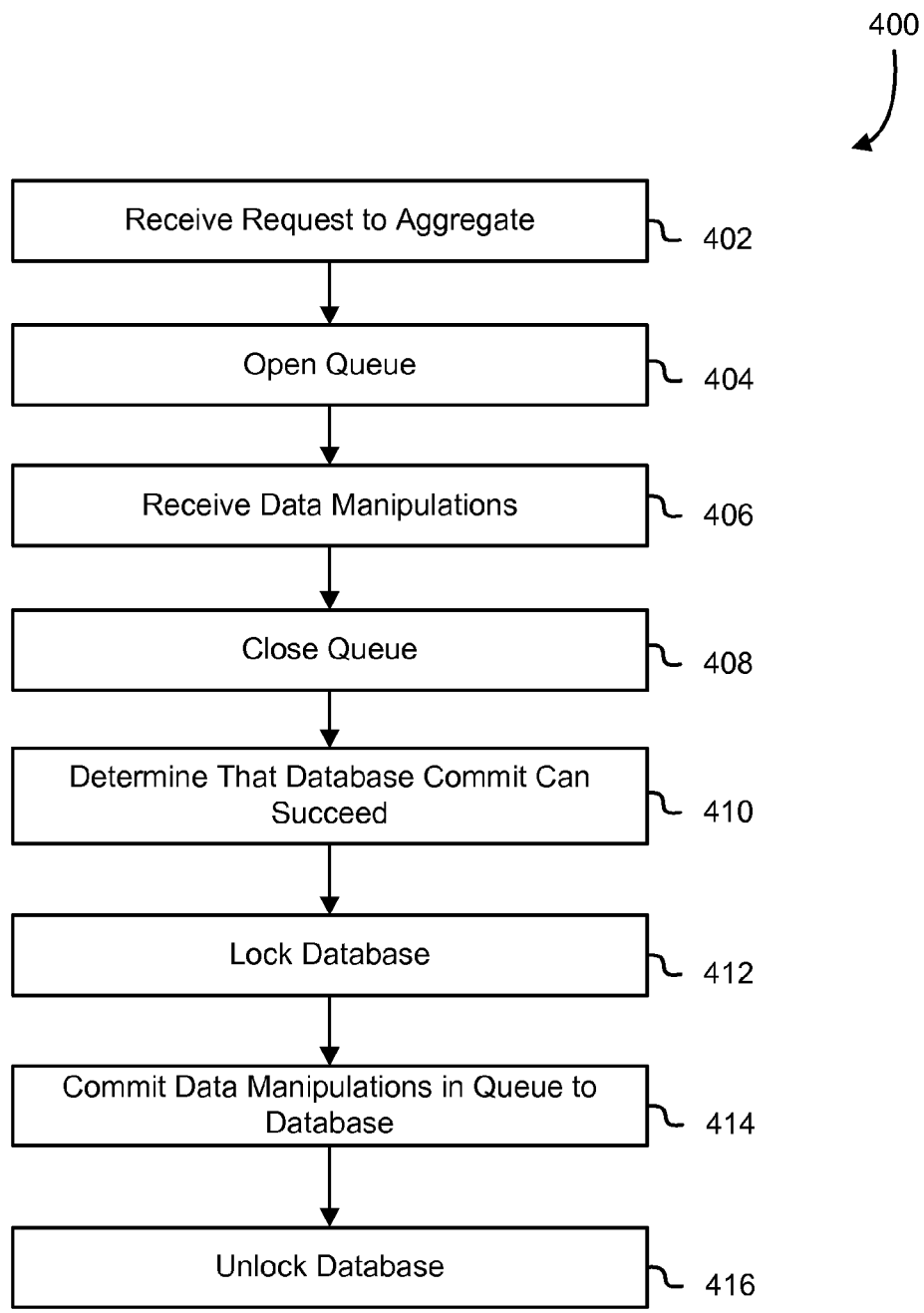
FIG. 4 shows an illustrative example of a process that may be used to aggregate data manipulation requests in a transaction in accordance with at least one embodiment.

Turning now to FIG. 4, an illustrative example of a process 400 that may be used to aggregate data manipulation requests in a transaction is shown. The process 400 may be accomplished by a system as seen in FIG. 1, including a client 102, transaction aggregator layer 104, database 106 and data aggregation queue 108. The client 102 may receive 402 a request to aggregate data manipulation requests in a single transaction. In response, the transaction aggregator layer 104 may open 404 a data aggregation queue 108. The transaction aggregator layer 104 may receive 406 data manipulation requests to include in the single transaction and store the data manipulation requests in the data aggregation queue 108. After all of the data manipulation requests have been received, the data aggregation queue 108 may be closed 408. The transaction aggregator layer 104 may determine 410 that the database 106 can successfully receive the single transaction. In some embodiments, this may involve comparing a timestamp of the data manipulation request against a timestamp of the dependencies of the data manipulation request in the database. If a dependency timestamp is later than the data manipulation request, the single transaction will fail. Otherwise, the transaction aggregator layer 104 locks 412 the database 106 relative to the scope of the transaction. The transaction aggregation layer 104 may then commit 414 and/or execute the data manipulation requests in the data aggregation queue during a single transaction. After the transaction is complete, the database may be unlocked 416.

In an alternative embodiment, the transaction aggregator layer 104 may not request the lock and simply attempt the transaction and rely on the database to determine whether the transaction succeeds or fails. If the transaction is successful, other data aggregation queues 108 may be scanned for conflicting data manipulation requests. If a data aggregation queue 108 contains a conflicting data manipulation request that would fail, a client 102 providing the data manipulation request may be notified that the transaction would fail before attempting the transaction. This notification would provide a fail-fast advantage in which a client 102 need not attempt a transaction before being notified that the transaction would fail.

In the event that a client 102 stops providing data manipulations to be stored in the data aggregation queue 108 without closing the data aggregation queue 108 and/or requesting the corresponding transaction be performed, the transaction aggregation layer 104 may perform cleanup operations. In one embodiment, the transaction aggregation layer 104 may purge the stored data manipulations from a data aggregation queue 108 after waiting for a period of time that exceeds a timeout value. Even though the data manipulations are purged, the data within the database remains consistent. Other reasons for purging a data aggregation queue 108 may include a fail-fast notification, conflicting data manipulations that would fail, incorrect API calls, too many failed API calls, total idle time, recent idle time or time between API calls.

Some or all of the process 400 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

Figure 5:
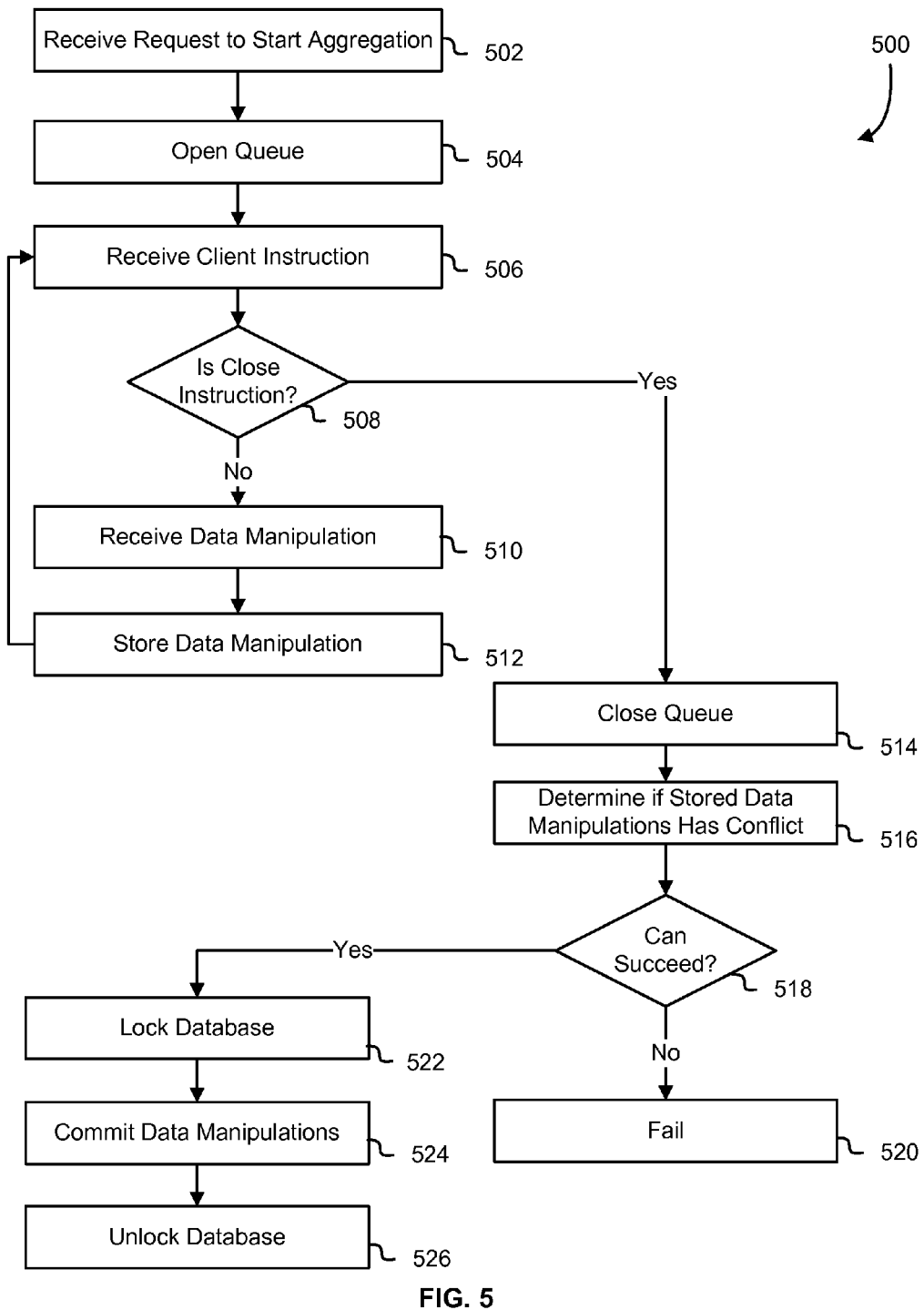
FIG. 5 shows an illustrative example of a process that may be used to aggregate data manipulation requests in a transaction through multiple requests in accordance with at least one embodiment.

Turning now to FIG. 5, an illustrative example of a process 500 that may be used to aggregate data manipulation requests in a transaction through multiple requests is shown. The process 400 may be accomplished by a system as seen in FIG. 1, including a client 102, transaction aggregator layer 104, database 106 and data aggregation queue 108. A transaction aggregator layer 104 may receive 502 a request to start aggregation, such as a request to construct a single transaction. Based on the request, the transaction aggregator layer 104 may open 504 a data aggregation queue 108. The transaction aggregator layer 104 may receive 506 an instruction. If the instruction is not 508 a close instruction, the instruction may include data manipulation requests which are received 510 and stored 512 in the data aggregation queue 108. The transaction aggregator layer 104 may then await further instructions, which may repeat operations 506 to 512. Once all of the data manipulation requests for the transaction are stored, the client may send a close instruction 514 which is received 506 by the transaction aggregator layer 104. As the message is 508 a close instruction, the transaction aggregator layer 104 closes the data aggregation queue 108. The transaction aggregator layer 104 determines 516 whether the transaction can succeed by examining whether the data manipulation requests in the data aggregation queue have a conflict with other data manipulation requests in the queue or the database. If the conflicts are found, the transaction cannot succeed 518 and the transaction will be failed 520. If the transaction can succeed 518, the transaction aggregation layer 104 locks 522 the database 106, commits 524 the data manipulation requests in the transaction to the database 106 and then unlocks 526 the database 106.

Figure 6:
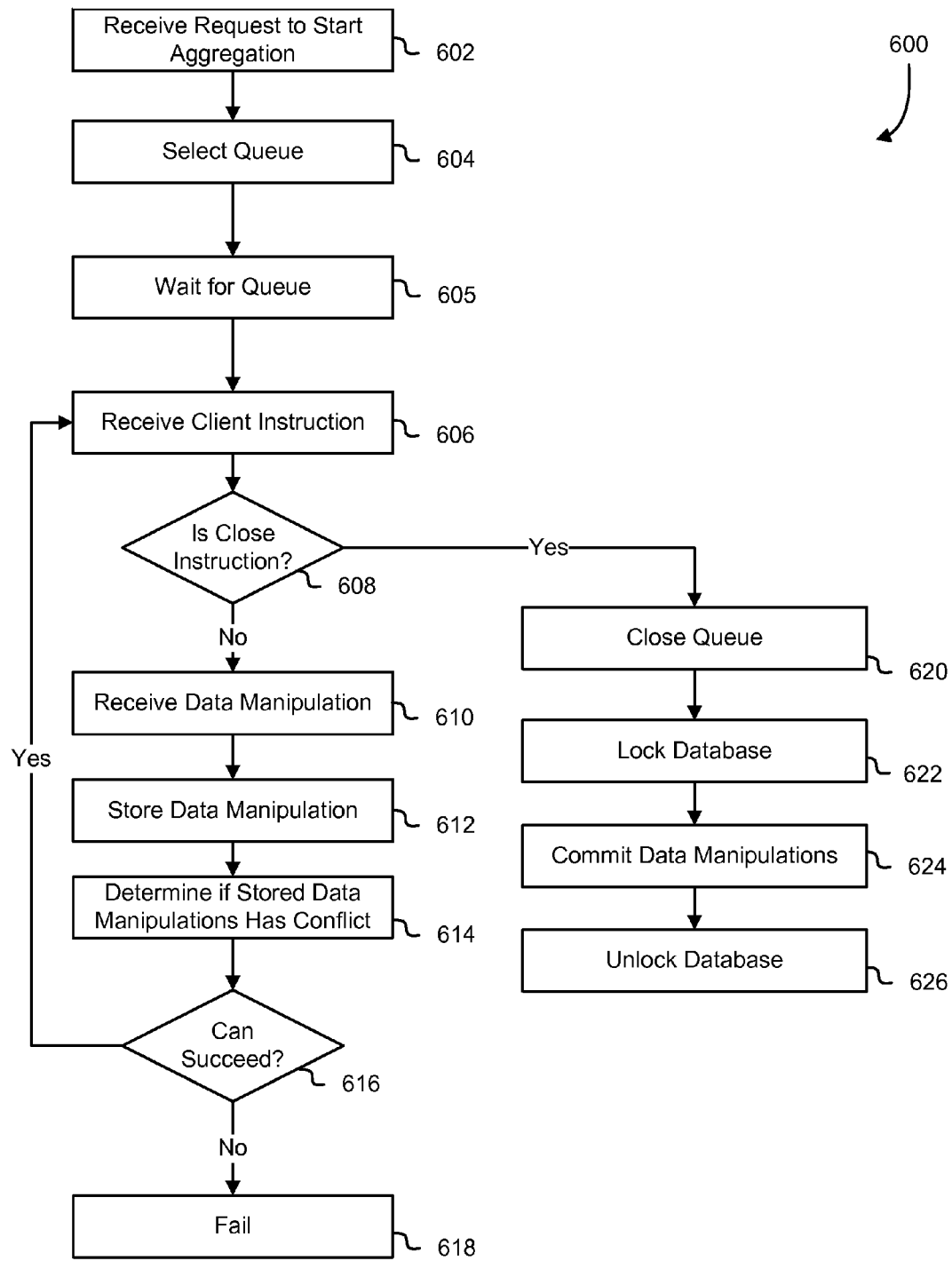
FIG. 6 shows an illustrative example of a process that may be used to aggregate data manipulation requests in a transaction with a fail-fast configuration in accordance with at least one embodiment.

Turning now to FIG. 6, an illustrative example of a process 600 that may be used to aggregate data manipulation requests in a transaction with a fail-fast configuration is shown. The process 400 may be accomplished by a system as seen in FIG. 2, including one or more clients 102, a transaction aggregator layer 104, a database 106, data aggregation queues 108 and a failure detection module 202. The transaction aggregator layer 104 may receive 602 a request to start aggregation, such as an API call to open a new transaction. A queue 108 matching the scope of request may be selected 604 to prevent use of the queue by other clients 102 that would also request a transaction on data within the scope represented by the data aggregation queue 108. If the queue 108 is not ready, the clients 102 may wait 605 for the queue. After the queue 108 is ready, the clients 102 may send instructions 606. If a received instruction is 608 not a close instruction, data manipulation requests may be received 610, stored 612 and determined 614 if the stored data manipulation requests have a conflict with other data manipulation requests or with changes to the database, such as data dependencies. If the transaction cannot succeed, the failure detection module 202 may cause the transaction to fail 618 based on the determined conflict in a fail-fast way before the transaction is closed. If the transaction can still succeed 616, the next instruction may be processed. If the instruction is a close instruction 608, the data aggregation queue 108 may be closed 620. As the transaction has been continually vetted by the failure detection module 202, the transaction aggregation layer 104 may lock 622 the database, commit 624 the transaction containing the data manipulation requests 624 and then unlock 626 the database.

The client 102 may also be billed for the services in use. For example, a customer may be billed for the number of data manipulation requests contained in a transaction. The customer may also be billed for a granularity and/or number of services provided. For example, a customer may be billed more for a larger number of data aggregation queues 104 providing a smaller scope than a larger number of queues that have a larger scope.

Figure 7:
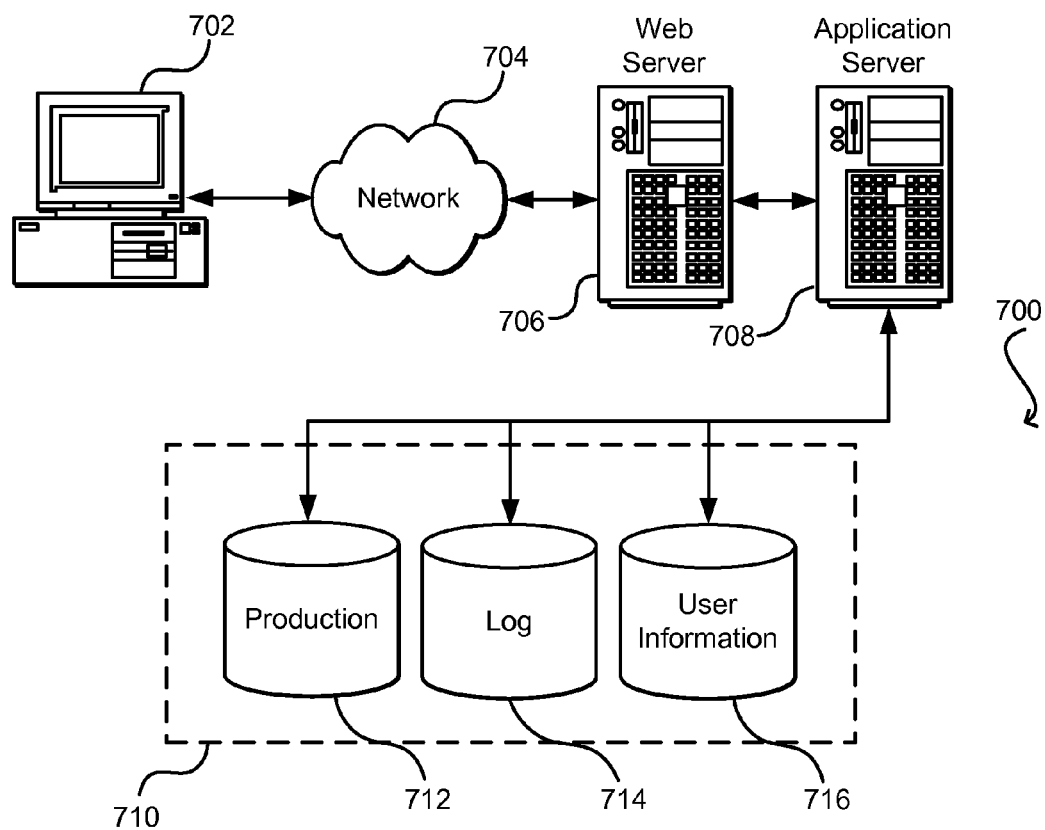
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the embodiments as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the scope of the claimed subject matter to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for managing large database transactions, comprising:
    receiving a request to prepare a database update at an aggregation layer supporting a database, the database update containing a plurality of data manipulation requests to be applied to the database;
    opening a storage queue to hold the data manipulation requests;
    receiving, through an application programming interface, a plurality of application programming interface calls over time, each application programming interface call of at least a subset of the plurality of application interface calls containing instructions for performing one or more of the data manipulation requests;
    storing the data manipulation requests in the storage queue to form the database update;
    determining whether the transaction results in a success or a failure to update the database;
    if the failure is determined, stopping storage of additional data manipulation requests in the storage queue and reporting the failure of the transaction;
    if the success is determined:
        receiving an indicator that all of the instructions for performing the data manipulation requests have been received,
        closing the storage queue to receipt of more data manipulation requests after receiving the indicator,
        locking the database to updates related to the data manipulation requests, and
        at a time after the success is determined:
        beginning a transaction with the database,
        executing the data manipulation requests in the storage queue on the database during the transaction, and
        closing the transaction; and
    unlocking the database after the database update succeeds or fails.

2. The computer-implemented method of claim 1, further comprising preparing a database transactional identifier at the aggregation layer for use by the database, the transactional identifier corresponding to the order in which the transaction was allocated.

3. The computer-implemented method of claim 1, wherein locking the database is performed upon receiving the request to prepare the database update.

4. The computer-implemented method of claim 1, wherein locking the database to updates related to the data manipulation requests further comprises determining the rows in the database that the data manipulation requests will operate upon.

5. The computer-implemented method of claim 1, wherein determining whether the database update can succeed is based at least in part on whether data in the database has changed relative to the receipt of the data manipulation requests.

6. The computer-implemented method of claim 5, further comprising:
    storing a timestamp representing the start of the database update; and
    wherein determining whether the database update can succeed further comprises comparing the timestamp to database entries touched by the data manipulation requests to determine if the data manipulation requests are still valid.

7. A computer-implemented method for aggregating a database transaction, comprising:
    receiving, by a transaction aggregation layer, a request to prepare a transaction to apply to a database comprising one or more data manipulation requests from one or more clients;
    opening a storage queue to hold received data manipulation requests after receiving the request to prepare the transaction;
    storing received data manipulation requests from the one or more clients in the storage queue to form the transaction;
    determining whether the transaction results in a success or a failure to update the database;
    if the failure is determined, stopping storage of additional data manipulation requests in the storage queue and reporting the failure of the transaction;
    if the success is determined, closing the storage queue to receipt of data manipulation requests after receiving all of the data manipulation requests to include in the transaction and, after closing the storage queue, submitting the data manipulation requests in the storage queue to the database.

8. The computer-implemented method of claim 7, further comprising:
    after closing the storage queue:
        locking the database such that data to be affected by the data manipulation requests are unchangeable; and
        unlocking the database after executing the data manipulation requests.

9. The computer-implemented method of claim 7, wherein storing received data manipulation requests further comprises:
    receiving instructions regarding the data manipulation requests identifying a transaction ordering of the data manipulation requests; and
    applying the ordering of the data manipulation requests according to the instructions.

10. The computer-implemented method of claim 7, further comprising: selecting a storage queue based at least in part on the request, the selected storage queue serving requests that can have a data collision, and determining through the use of the selected storage queue whether an actual collision has occurred.

11. The computer-implemented method of claim 7, further comprising:
    determining a subset of the data manipulation requests having one or more collisions with a second transaction;

failing the subset of the data manipulation requests related to the one or more collisions; and executing one or more data manipulation requests outside of the subset of data manipulation requests.

12. The computer-implemented method of claim 7, further comprising:

selecting the storage queue from a plurality of storage queues based at least in part on dependencies in the database of data associated with the received manipulation requests and based at least in part on a scope of the transaction.

13. The computer-implemented method of claim 7, wherein determining whether the update to the database can succeed comprises determining if a change has been made to the database that affects a data manipulation request in the storage queue while the storage queue is receiving data manipulation requests, and at a time after discovery of the change but before the storage queue is closed, causing the request to prepare the transaction to fail.

14. The computer-implemented method of claim 13, wherein storing received data manipulation requests in the storage queue to form the transaction further comprises aggregating data manipulation requests in the storage queue that are received over a plurality of requests.

15. A computer system for database transaction queuing, comprising:

one or more computing resources having one or more processors and memory including executable instructions that, when executed by the one or more processors, cause the one or more processors to implement at least:

a data aggregation queue that stores data manipulation requests for use as a combined transaction with a database;

a transaction aggregator that:

receives data manipulation requests on behalf of the database through one or more requests comprising one or more data manipulation requests, stores the received data manipulation requests in the data aggregation queue, determines whether the combined transaction results in a success or a failure to update the database, if the failure is determined, stops storing additional data manipulation requests associated with the combined transaction and reports the failure of the combined transaction, and if the success is determined, closes the data aggregation queue after receiving all of the data manipulation requests associated with the combined transaction and, after closing the storage queue, submits the data manipulation requests in the data aggregation queue to the database; and an application programming interface that receives the data manipulation requests and electronically communicates the data manipulation requests to the transaction aggregator.

16. The computer system of claim 15, wherein the data aggregation queue further comprises a semi-persistent data store.

17. The computer system of claim 15, further comprising a failure detection module that detects changes in the database that affect data manipulation requests in the data aggregation queue, and upon detecting a change, causes the combined transaction to fail.

18. The computer system of claim 15, wherein the data aggregation queue forms part of a set of data aggregation queues, the data aggregation queue selected based at least in part on the one or more requests such that other requests to manipulate the same data within the database use the same data aggregation queue.

19. The computer system of claim 15, wherein the database is optimized to store a large amount of information.

20. The computer system of claim 19, wherein the data aggregation queue is optimized for a high volume of small operations.

21. One or more non-transitory computer-readable storage media having collectively stored thereon executable instructions that, when executed by one or more processors of a computer system, cause the computer system to at least:

receive an application programming interface call to prepare a queued database transaction, the transaction containing one or more transactional writes;

open a storage queue to hold received transactional writes;

receive a plurality of requests over time to store transactional writes, each request including one or more of the received transactional writes, the received transactional writes stored in the storage queue to form the transaction;

determine whether the transaction results in a success or a failure to update the database;

if the failure is determined, stop storing transactional writes from received requests in the storage queue and report the failure of the transaction; and if the success is determined, receive an application programming interface call to close the storage queue and, after closing the storage queue, submit the received transactional writes in the storage queue to the database.

22. The non-transitory computer-readable storage media of claim 21, wherein the application interface call is received by a billing manager, the storage queue is managed by the billing manager, and at least a portion of the received transactional writes are for usage of a service.

23. The non-transitory computer-readable storage media of claim 21, wherein the application interface call is received by a catalog manager, the storage queue is managed by the catalog manager, and at least a portion of the received transactional writes include information about an item offered for consumption in an electronic environment.

24. The non-transitory computer-readable storage media of claim 21, wherein the instructions further comprise instructions that, when executed, cause the computer system to at least:

assess a cost to a client based at least in part on a number of received transactional writes performed.

25. The non-transitory computer-readable storage media of claim 21, wherein the ratio of connections to the application programming interface versus the connections to the database is greater than one.

26. The non-transitory computer-readable storage media of claim 21, wherein the instructions further comprise instructions that, when executed, cause the computer system to at least prepare transaction identification on behalf of the database, the transaction identification identifying the order of enablement of the transaction relative to other transactions.

* * * * *